(No Model.)
J. K. WILMOT.
FARM GATE.
No. 312,311. Patented Feb. 17, 1885.
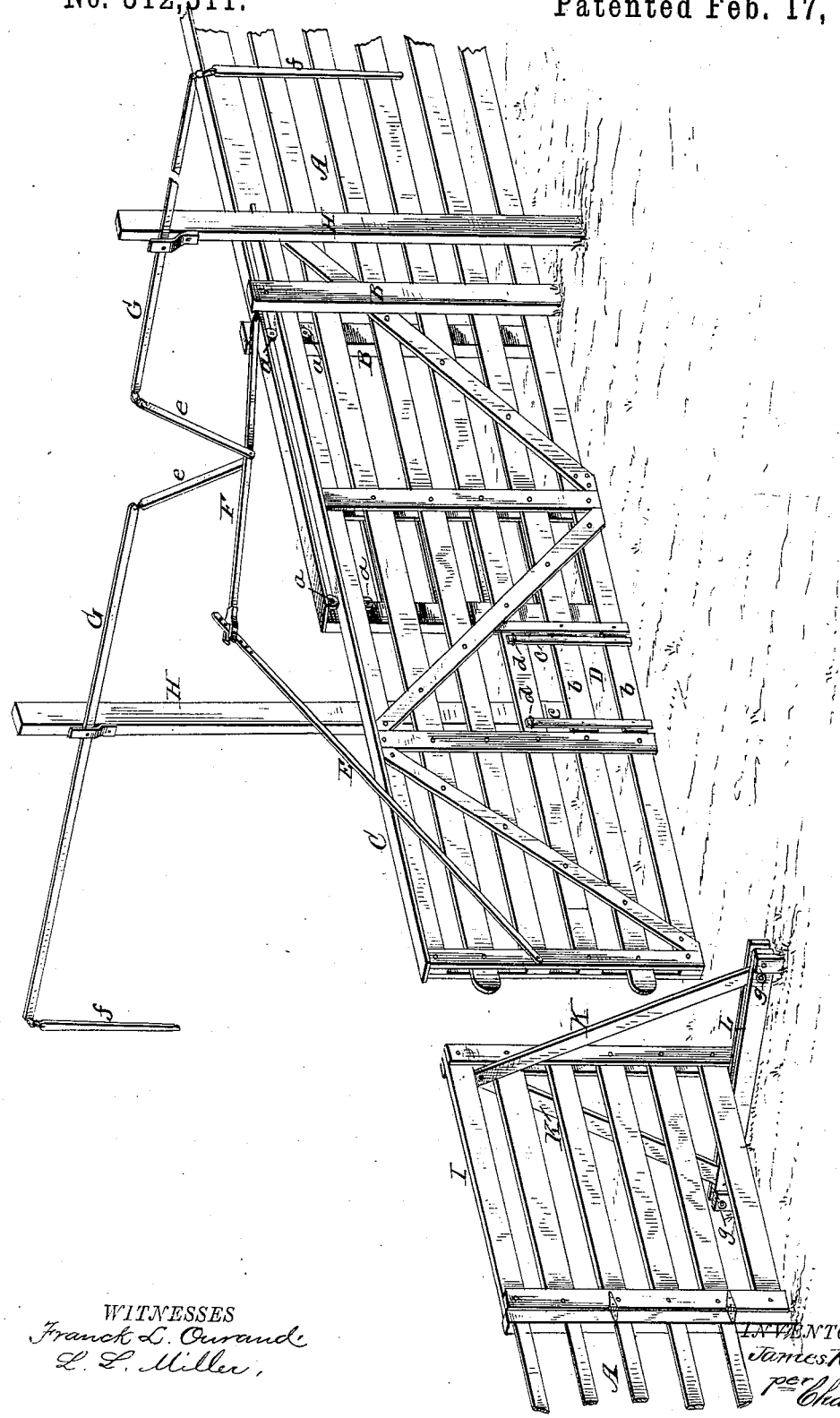

United States Patent Office.

JAMES K. WILMOT, OF OCONEE, ILLINOIS.

FARM-GATE.

SPECIFICATION forming part of Letters Patent No. 312,311, dated February 17, 1885.

Application filed May 17, 1884. (No model.)

*To all whom it may concern:*

Be it known that I, JAMES K. WILMOT, a citizen of the United States, residing at Oconee, in the county of Shelby and State of Illinois, have invented certain new and useful Improvements in Farm-Gates; and I do hereby declare that the following is a full, clear, and exact description of the same, reference being had to the annexed drawing, making a part of this specification, and to the letters and figures of reference marked thereon.

The present invention has relation to certain new and useful improvements in farm-gates; and it consists in the several details of construction, substantially as shown in the drawing and hereinafter described and claimed.

In the accompanying drawing, which represents a perspective view of my invention, A designates the fence, of the usual construction, having secured in the ground, a suitable distance from each side thereof, posts B. The fence A has friction-rollers $a$, between which is located the top rail of a sliding gate, C, said gate having a supplemental gate, D, adapted to raise in opening, so as to let pass small stock, such as pigs. This supplemental gate D consists of the two rails $b$, connected to upright straps $c$, which pass through staples or guides $d$ at their upper ends, the gate closing by its own weight.

To the forward end of the gate C is connected one end of a rod, E, the opposite end thereof being adjustably connected to a fulcrum-bar, F, by a pin passing through said bar and one of a series of holes in the end of the rod E, thus enabling the angle of the rod and fulcrum-bar to be adjusted to adapt them to levers of different lengths, the levers G being connected to the fulcrum-bar by arms $e$, and near their center to upright posts H. The fulcrum-bar F is suitably connected to the posts B by a bolt or other means that will allow said bar to work as if on a pivot. When it is desired to open the gate C, one of the handles $f$, depending from the levers G, is pulled down upon, and the opposite handle is raised in closing the gate.

To the opposite end of the fence A is hinged a gate, I, which is held closed by angle-braces K, pivoted at their upper ends to the gate and at their lower ends bolted to a stationary sill, L, permanently secured to stakes driven in the ground.

In opening the gate I the bolts $g$ are first withdrawn and the pivoted braces K swung up from engagement with the sill L, after which the gate can be swung open and used in connection with the sliding gate C when desired to have an extra wide passage-way for herds of cattle or other purposes; or the gate I can be used independent of the gate C.

Having now fully described my invention, what I claim as new, and desire to secure by Letters Patent, is—

The combination, with a sliding gate and levers for operating the same, of a swinging gate in line therewith, angle-braces pivoted at their upper ends to said swinging gate, and a transverse sill secured to the ground, to which the lower ends of the braces are detachably connected, substantially as described.

In testimony that I claim the above I have hereunto subscribed my name in the presence of two witnesses.

JAMES K. WILMOT.

Witnesses:
W. H. AUGHINBAUGH,
J. S. BOOTES.